United States Patent [19]

Stroven et al.

[11] Patent Number: 5,519,258

[45] Date of Patent: May 21, 1996

[54] SYSTEM AND METHOD FOR CONTROLLING VEHICLE LIFT GATE WINDOW WIPER

[75] Inventors: Jeffrey J. Stroven, Milford; Raymond S. Alvey, Utica, both of Mich.

[73] Assignee: Ford Motor Company, Dearborn, Mich.

[21] Appl. No.: 155,378

[22] Filed: Nov. 22, 1993

[51] Int. Cl.$^6$ ................................................... B60S 1/58
[52] U.S. Cl. ........................ 307/10.100; 15/250.16; 318/DIG. 2
[58] Field of Search ........................ 307/9.1, 10.1, 307/10.6; 318/443, 444, DIG. 2; 417/326; 15/250.001, 250.12, 250.13, 250.16, 250.17; 200/61.62

[56] References Cited

U.S. PATENT DOCUMENTS

| | | | |
|---|---|---|---|
| 3,088,153 | 5/1963 | Lystad | 15/250.12 |
| 3,112,510 | 12/1963 | Forbush et al. | 15/250.16 |
| 3,126,569 | 3/1964 | Scott et al. | 15/250.16 |
| 4,268,018 | 5/1981 | Langanke | 200/61.62 |
| 4,276,501 | 6/1981 | Fanz | 15/250.17 |
| 4,310,943 | 1/1982 | Palma | 15/250.16 |
| 4,336,482 | 6/1982 | Goertler et al. | 318/443 |
| 4,339,698 | 7/1982 | Kearns | 15/250.17 |
| 4,881,019 | 11/1989 | Shiraishi et al. | 318/444 |
| 4,999,550 | 3/1991 | Jones | 15/250.17 |
| 5,252,898 | 10/1993 | Nolting et al. | 318/444 |
| 5,274,875 | 1/1994 | Chou | 15/250.001 |

FOREIGN PATENT DOCUMENTS

4217141A1  11/1993  Germany.
2217271  10/1989  United Kingdom.

*Primary Examiner*—Jonathan Wysocki
*Assistant Examiner*—Richard T. Elms
*Attorney, Agent, or Firm*—Peter Abolins; Roger L. May

[57] ABSTRACT

A system and method for controlling a wiper for a vehicle window on a lift gate. The control system and method include an ignition switch (12), lift gate position switch (14), window position switch (16), washer switch (18) and wiper switch (20) for generating (42) multiple input signals. The control system and method also include a microprocessor (24) for processing (44) the input signals to determine wiper operations, and an output driver (26) for generating (46) an output signal to control the wiper in response to the wiper operations determined.

16 Claims, 6 Drawing Sheets

SYSTEM AND METHOD FOR CONTROLLING VEHICLE LIFT GATE WINDOW WIPER

TECHNICAL FIELD

This invention relates generally to vehicle window wiper control. More particularly, this invention relates to a system and method for controlling a wiper for a vehicle window on a lift gate.

BACKGROUND ART

In recent years, a variety of control systems have been developed and are now in use for automotive vehicle window wipers. For the most part, however, these control systems have been directed to wipers associated with vehicle windshields, as opposed to vehicle rear windows.

Of the more limited number of control systems directed to rear window wiper control, most fail to stand alone. More specifically, these control systems are dependant upon input from other vehicle systems or parameters, such as windshield wiper controls, window defoggers, vehicle speed, or vehicle direction. Moreover, these control systems often ignore a variety of important rear window wiper parameters.

Rear window wipers are most often used on vehicles having a lift gate wherein the rear window can be opened. However, most rear window wiper control systems typically fail to account for important rear window wiper parameters such as window position and lift gate position. Examples of such control systems can be found in U.S. Pat. Nos. 4,999,550 issued to Jones; 4,881,019 issued to Shiraishi et al.; and 4,276,501 issued to Fanz.

Other rear window wiper control systems, while independent of other vehicle systems or parameters, are directed to control of only limited aspects of the rear window wiper. For example, U.S. Pat. No. 4,336,482 issued to Goertler et al. discloses a control system solely for a rear window wiper motor. Such control systems again fail to account for a variety of important rear window wiper parameters, such as window position and lift gate position.

Thus, an improved system and method for controlling a rear window wiper would be independent of other vehicle systems and parameters. Such an improved control system and method would also account for a variety of important rear window wiper parameters, such as rear window position and lift gate position.

SUMMARY OF INVENTION

According to the present invention, a system and method are provided for controlling a wiper for a vehicle window on a lift gate. The system of the present invention comprises means for generating a plurality of input signals indicative of a vehicle ignition status, the wiper status, a washer status, the window position and the lift gate position. The system further comprises means for processing the plurality of input signals to determine a wiper operation, and means for generating an output signal to control the wiper in response to the wiper operation determined.

The method of the present invention comprises generating a plurality of input signals indicative of a vehicle ignition status, the wiper status, a washer status, the window position and the lift gate position. The method further comprises processing the plurality of input signals to determine a wiper operation, and generating an output signal to control the wiper in response to the wiper operation determined.

Accordingly, it is the principle object of the present invention to provide an improved system and method for controlling a wiper for a vehicle window on a lift gate.

This and other objects and advantages will be readily apparent upon consideration of the following description and drawings.

BEST MODE FOR CARRYING OUT THE INVENTION

Figure 1:
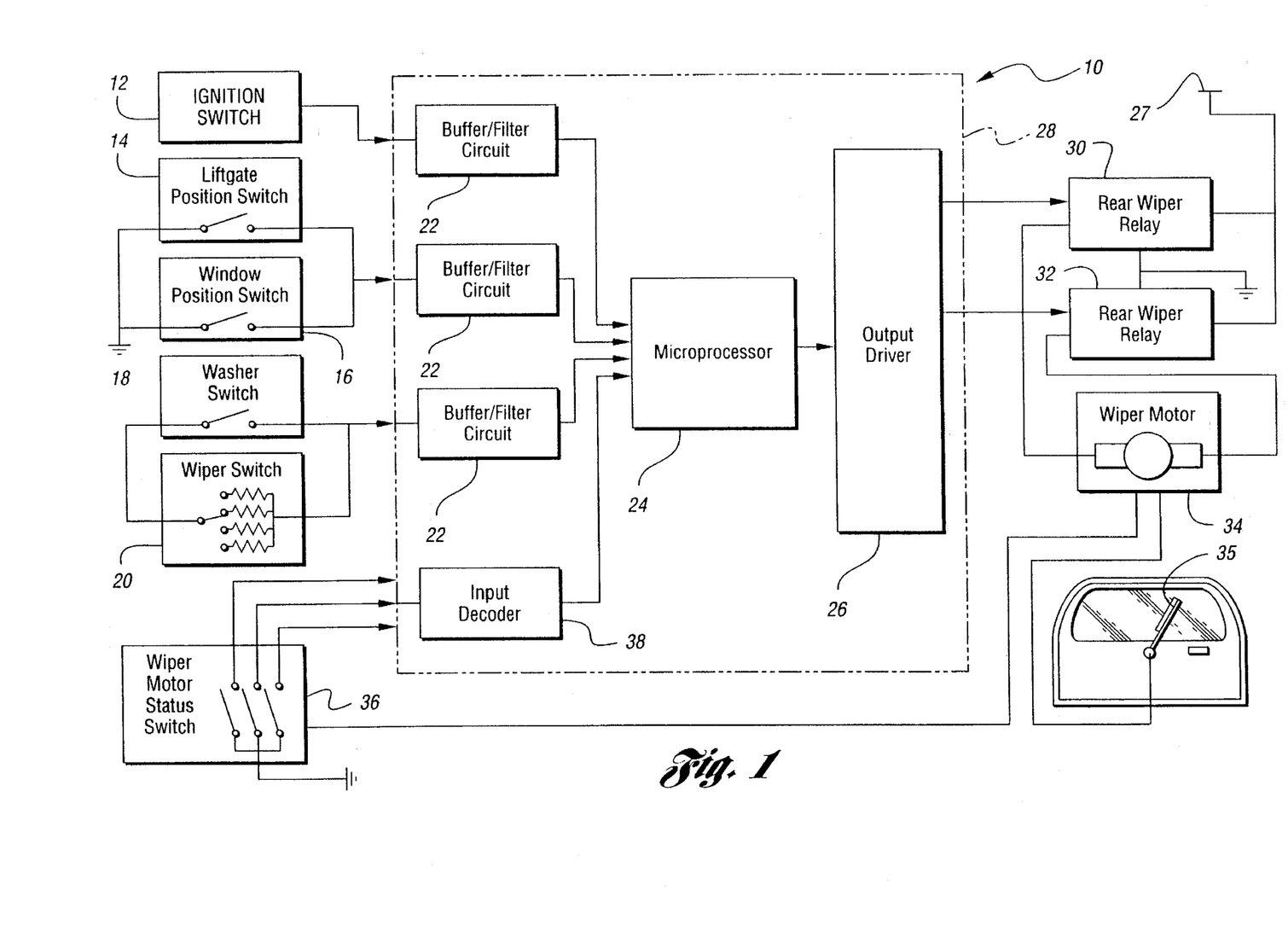
FIG. 1 is a simplified schematic diagram of the control system of the present invention.

Referring now to FIG. 1, a simplified schematic diagram of the control system of the present invention is shown, denoted generally by reference numeral 10. The control system (10) comprises an ignition switch (12), a lift gate position switch (14), a rear window position switch (16), a rear window washer switch (18) and a rear wiper switch (20). The system (10) further comprises input buffer/filter circuits (22), a microprocessor (24) and an output driver (26).

Ignition switch (12) serves to generate an input signal indicating whether the vehicle ignition status is active or inactive. As used herein, the vehicle ignition status is defined as active when the vehicle ignition switch (12) is in either a "run" or an "accessory" position. In either position, electrically powered vehicle systems, such as the system (10) of the present invention, are energized by either a generator or the vehicle battery (27). Conversely, the vehicle ignition status is defined as inactive when the vehicle ignition switch (12) is in any other position, such as an "off" or "start" position.

Lift gate position switch (14) serves to generate an input signal indicating whether the lift gate position is open or closed. Similarly, window position switch (16) serves to generate an input signal indicating whether the window position is open or closed. As used herein, the lift gate position and the window position are respectively defined as closed only when the lift gate or window is securely closed. For any other lift gate or window position, such as ajar, the lift gate and window positions are respectively defined as open.

Washer switch (18) serves to generate an input signal indicating whether the rear window washer status is active or inactive, which are defined as the "on" and "off" positions, respectively, thereof. Finally, wiper switch (20) serves to generate an input signal indicating whether the wiper status is active or inactive. As used herein, the wiper status is defined as inactive when the wiper switch (20) is in the "off" position. The wiper status is defined as active when the wiper switch (20) is in any other position, such as an "interval," "low" or "high" position.

In the control system (10) of the present invention, ignition switch (12), lift gate position switch (14), window position switch (16), washer switch (18) and wiper switch (20) together provide means for generating a plurality of input signals. As detailed above, such input signals are indicative of the vehicle ignition status, the wiper status, the washer status, the window position and the lift gate position.

Still referring to FIG. 1, the input buffer/filter circuits (22) are in electrical communication with each of the ignition switch (12), lift gate position switch (14), window position switch (16), washer switch (18) and wiper switch (20). As their name implies, the input buffer/filter circuits (22) serve to buffer and filter the various input signals from such switches (12, 14, 16, 18, 20).

Microprocessor (24) is also in electrical communication with the input buffer/filter circuits (22) in order to receive the plurality of input signals from the switches (12, 14, 16, 18, 20). The microprocessor (24) and input buffer/filter circuits (22) together provide means for processing the plurality of input signals from the switches (12, 14, 16, 18, 20) to determine appropriate operations for the vehicle rear window wiper (35). Microprocessor (24) is also programmed and/or manufactured to provide various means for deciding to actuate the wiper (35) according to the method of the present invention as described in more detail below.

Finally, microprocessor (24) is also in electrical communication with output driver (26). Output driver (26) provides means for generating an output signal to control the wiper (35) and washer in response to the wiper and washer operations determined. Input buffer/filter circuits (22), microprocessor (24) and output driver (26) may be conveniently packaged as part of a generic electronic module, or GEM (28).

Output driver (26) activates or deactivates a rear wiper up relay (30) and a rear wiper down relay (32). The rear wiper relays (30, 32) are in electrical communication with a wiper motor (34) to finally actuate the wiper (35). A wiper motor status switch (36) is also in electrical communication with the wiper motor (34) and with the microprocessor (24), via an input decoder (38), to provide feedback to the microprocessor (24) on the position of the wiper motor (34).

Figure 2:
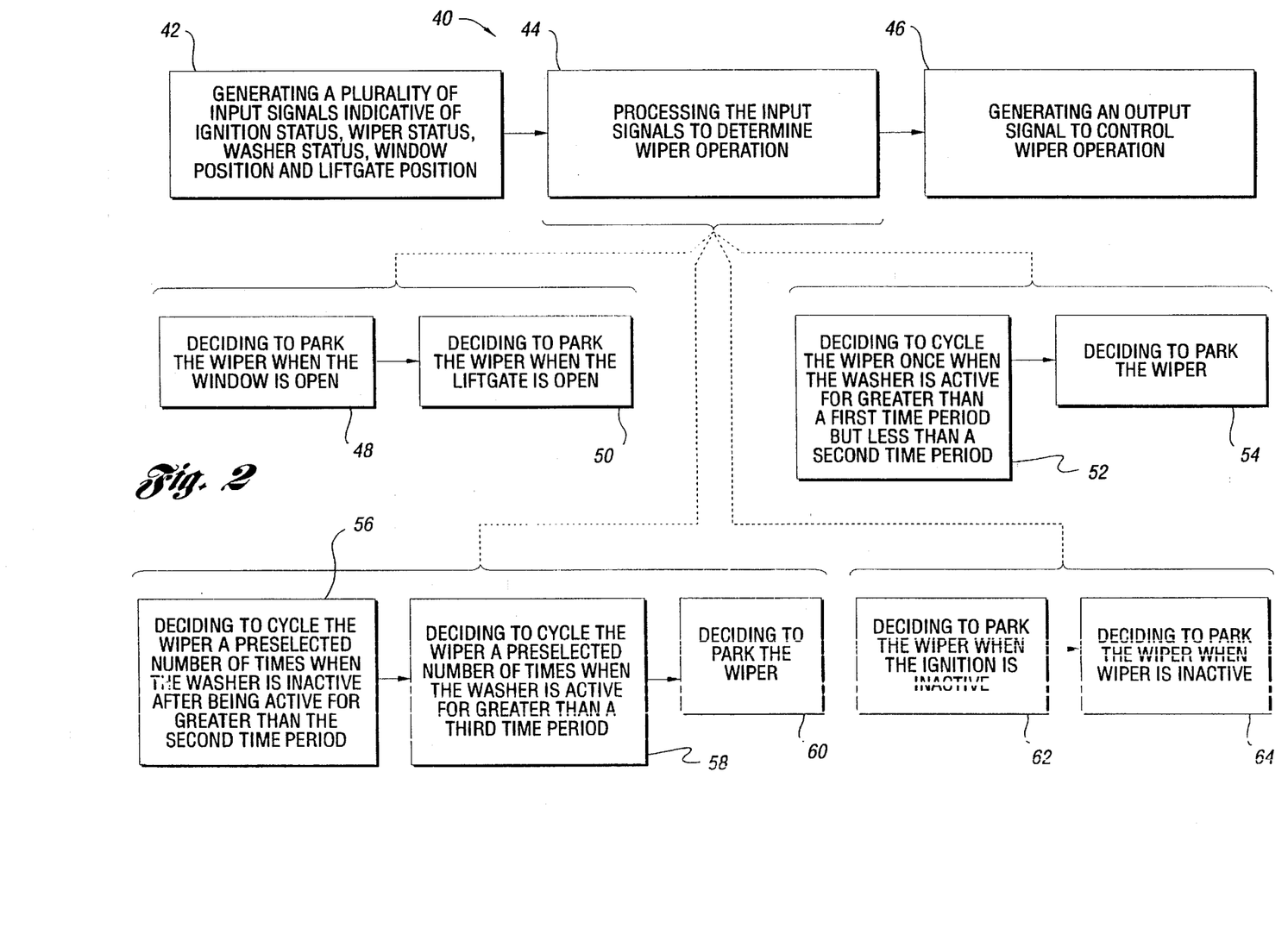
FIG. 2 is a block diagram of the control method of the present invention.

Referring now to FIG. 2, a block diagram of the control method of the present invention is shown, denoted generally by reference numeral 40. The control method (40) comprises generating (42) a plurality of input signals indicative of a vehicle ignition status, the wiper status, a washer status, the window position and the lift gate position, and processing (44) the plurality of input signals to determine a wiper operation. The control method (40) further comprises generating (46) an output signal to control the wiper (35) in response to the wiper operation determined.

Processing (44) the input signals itself comprises a number of additional steps, depending on the information provided by the various input signals previously described. More specifically, processing (44) the input signals comprises deciding (48) to park the wiper (35) out of contact with the window when the window is open, as well as deciding (50) to park the wiper (35) out of contact with the window when the lift gate is open.

Processing (44) the input signals also comprises deciding (52) to cycle the wiper (35) once when the washer is activated for greater than a first preselected time period but less than a second preselected time period. In that event, processing (44) the input signals further comprises deciding (54) to park the wiper (35) out of contact with the window. In the preferred embodiment of the control method (40) of the present invention, the first and second preselected time periods are approximately 135 milliseconds and 290 milliseconds, respectively, plus or minus 25 milliseconds.

Still referring to FIG. 2, processing (44) the input signals also comprises deciding (56) to cycle the wiper (35) a preselected number of times when the washer is inactive after being active for greater than the second preselected time period. In that event, processing (44) the input signals further comprises deciding (60) to park the wiper (35) out of contact with the window. As previously stated, in the preferred embodiment of the control method (40) of the present invention, the second preselected time period is approximately 290 milliseconds, plus or minus 25 milliseconds. Additionally, the preselected number of times for cycling the wiper (35) is preferably three.

Processing (44) the input signals also comprises deciding (58) to cycle the wiper (35) the preselected number of times when the washer is active for greater than a third preselected time period. In that event, processing (44) the input signals further comprises deciding (60) to park the wiper (35) out of contact with the window. As previously stated, the preferred number of times for cycling the wiper (35) is three. Additionally, in the preferred embodiment of the control method (40) of the present invention, the third preselected time period is approximately ten seconds.

Finally, processing (44) the input signals further comprises deciding (62) to park the wiper (35) out of contact with the window when the vehicle ignition is inactive. Processing (44) the input signals still further comprises deciding (64) to park the wiper (35) out of contact with the window when the wiper (35) is inactive.

Figure 3:
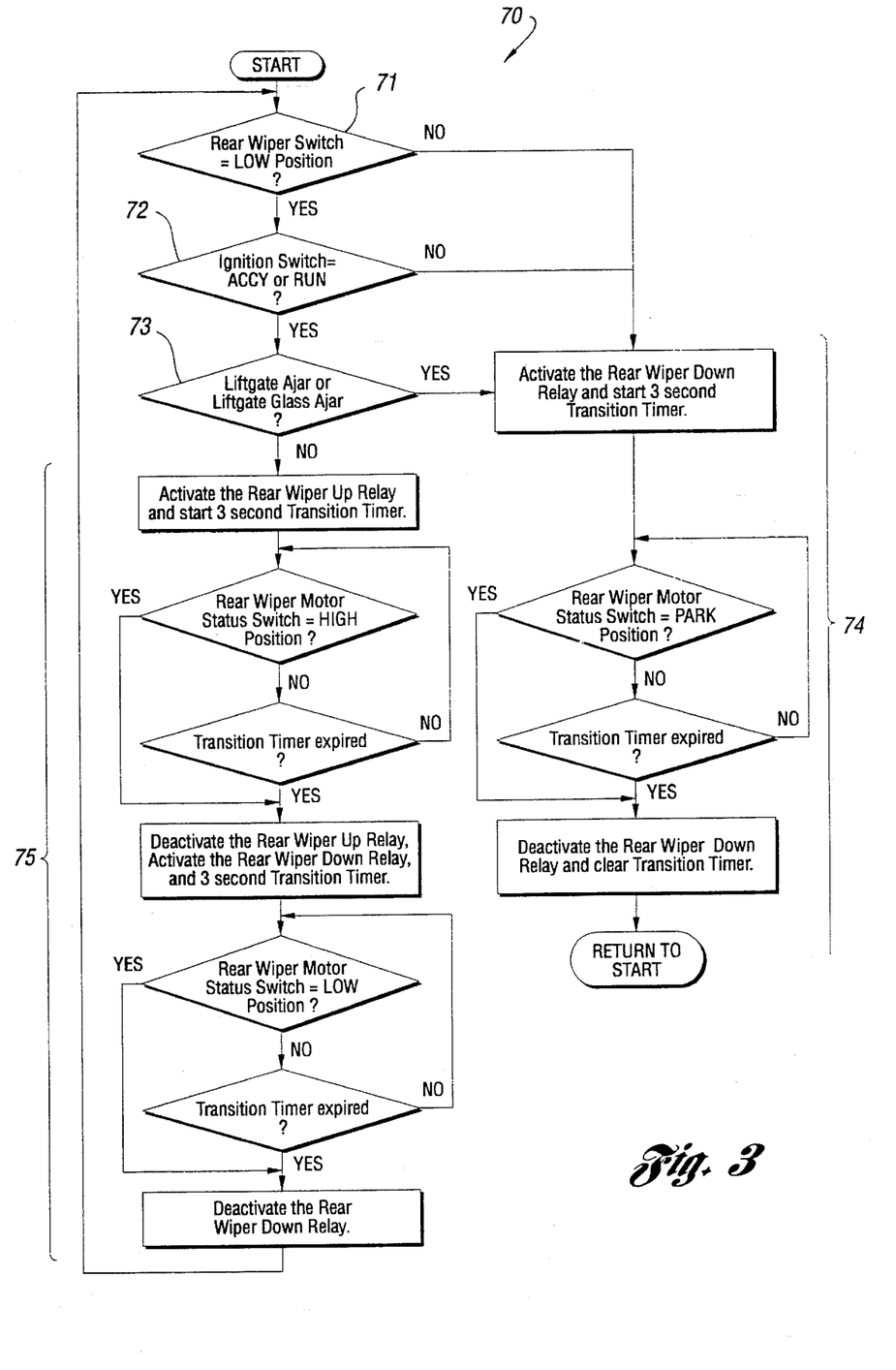
FIG. 3 is a wiper speed control flowchart for the control method of the present invention.

Referring now to FIG. 3, a wiper speed control flowchart for the control method (40) of the present invention is shown, denoted generally by reference numeral 70. According to the wiper speed control flowchart (70), the system (10) and method (40) of the present invention first check (71, 72, 73) the respective statuses of the ignition switch (12), lift gate position switch (14), window position switch (16), and wiper switch 20).

In the event that, as defined above, the lift gate is open, the window is open, the ignition is inactive, or the wiper (35) is inactive, the system (10) and method (40) of the present invention proceed to park (74) the wiper (35). According to the system (10) and method (40) of the present invention, a parked position for the wiper (35) is preferably defined as that position wherein the wiper (35) is substantially horizontal with respect to ground and out of contact with the window. To park the wiper (35), the rear wiper down relay (32) is activated until such time as either the motor status switch (36) indicates that the wiper motor (34) has a park position, or a three second transition timer has expired.

However, in the event that, as defined above, the lift gate is closed, the window is closed, the ignition is active, and the wiper (35) is active, the system (10) and method (40) of the present invention proceed to cycle the wiper (35) at the speed desired (75). To that end, the rear wiper up relay (30) is activated until such time as either the motor status switch (36) indicates that the wiper motor (34) has a high position, or a three second transition timer has expired.

Thereafter, the rear wiper down relay (32) is activated until such time as either the motor status switch (36) indicates that the wiper motor (34) has a low position, or a three second transition timer has expired. Finally, before a similar cycle (75) of the wiper (35) may be repeated, the respective statuses of the ignition switch (12), lift gate position switch (14), window position switch (16), and wiper switch (20) are checked again (71, 72, 73).

Thus, the system (10) and method (40) of the present invention park the wiper (35) when either the lift gate or the window are open, or when the vehicle ignition switch (12) is turned off. Moreover, the system (10) and method (40) also park the wiper (35) when the wiper switch (20) is turned off.

Figure 4A:
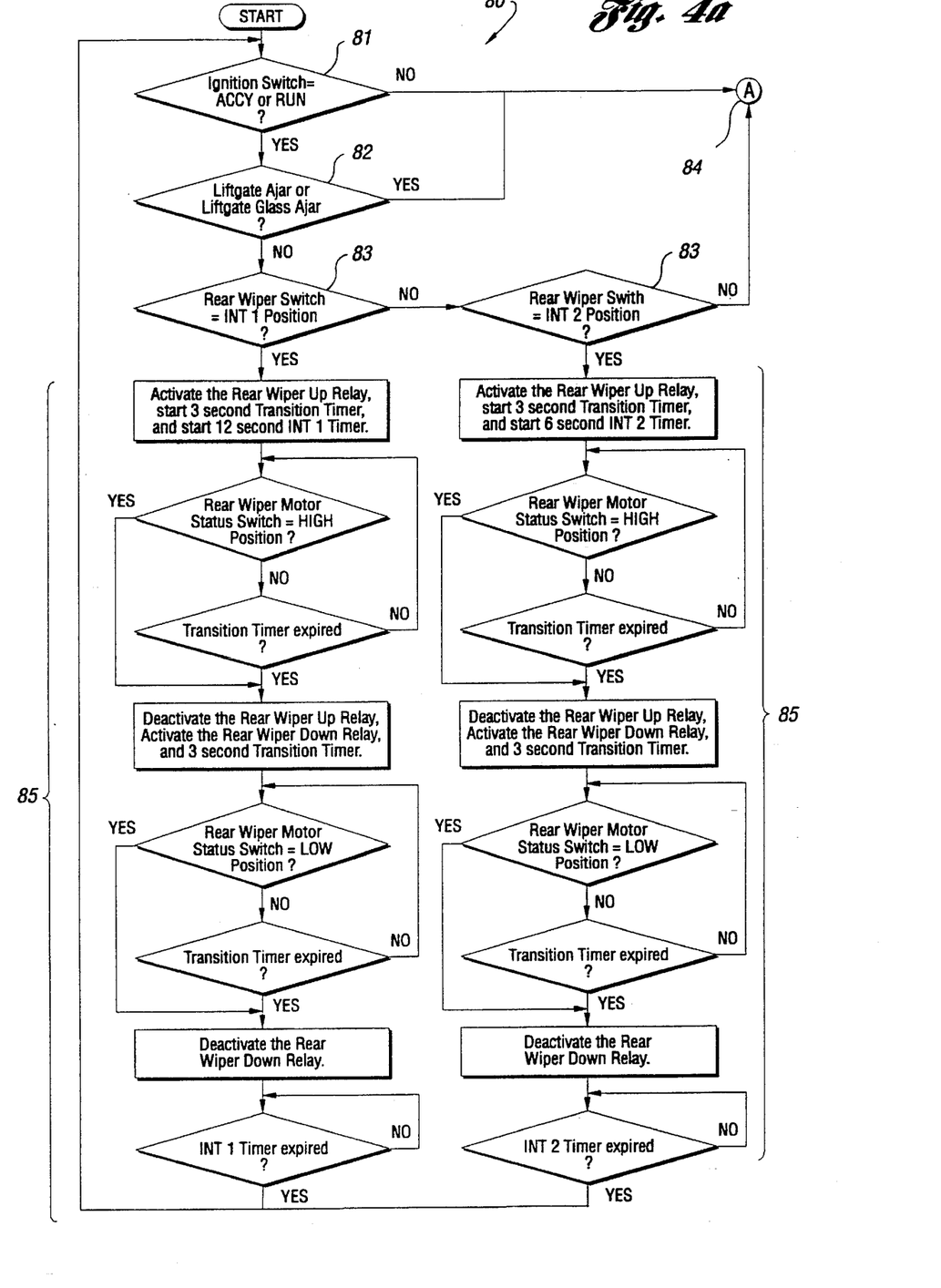
FIGS. 4a and 4b are a wiper interval control flowchart for the control method of the present invention.
Figure 4B:
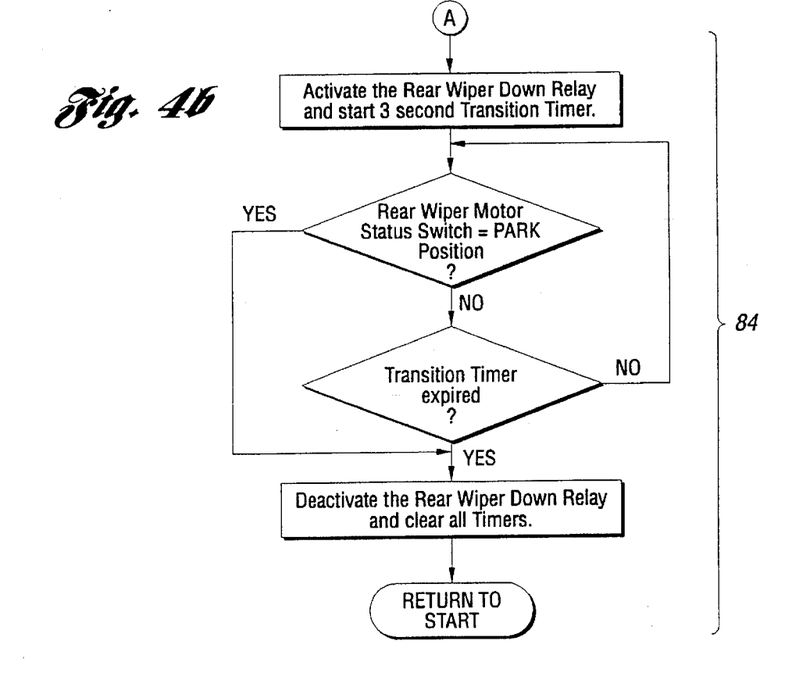

Referring now to FIGS. 4a and 4b, a wiper interval control flowchart for the control method (40) of the present invention is shown, denoted generally by reference numeral 80. According to the wiper interval control flowchart (80), the system (10) and method (40) of the present invention first check (81, 82, 83) the respective statuses of the ignition switch (12), lift gate position switch (14), window position switch (16), and wiper switch (20).

In the event that, as defined above, the lift gate is open, the window is open, the ignition is inactive, or the wiper (35) is inactive, the system (10) and method (40) of the present invention proceed to park (84) the wiper (35). To park the wiper (35), the rear wiper down relay (32) is activated until such time as either the motor status switch (36) indicates that the wiper motor (34) has a park position, or a three second transition timer has expired.

However, in the event that, as defined above, the lift gate is closed, the window is closed, the ignition is active, and the wiper (35) is active with an interval setting, the system (10) and method (40) of the present invention proceed to cycle (85) the wiper (35) at the interval speed desired. To that end, the rear wiper up relay (30) is activated until such time as either the motor status switch (36) indicates that the wiper motor (34) has a high position, or a three second transition timer has expired.

Thereafter, the rear wiper down relay (32) is activated until such time as either the motor status switch (36) indicates that the wiper motor (34) has a low position, or a three second transition timer has expired. Finally, before a similar cycle (85) of the wiper may be repeated, the respective statuses of the ignition switch (12), lift gate position switch (14), window position switch (16), and wiper switch (20) are checked again (81, 82, 83) after the appropriate interval timer has expired.

Thus, once again, the system (10) and method (40) of the present invention park the wiper (35) when either the lift gate or the window are open, or when the vehicle ignition switch (12) is turned off. Moreover, the system (10) and method (40) also park the wiper (35) when the wiper switch (20) is turned off.

Figure 5A:
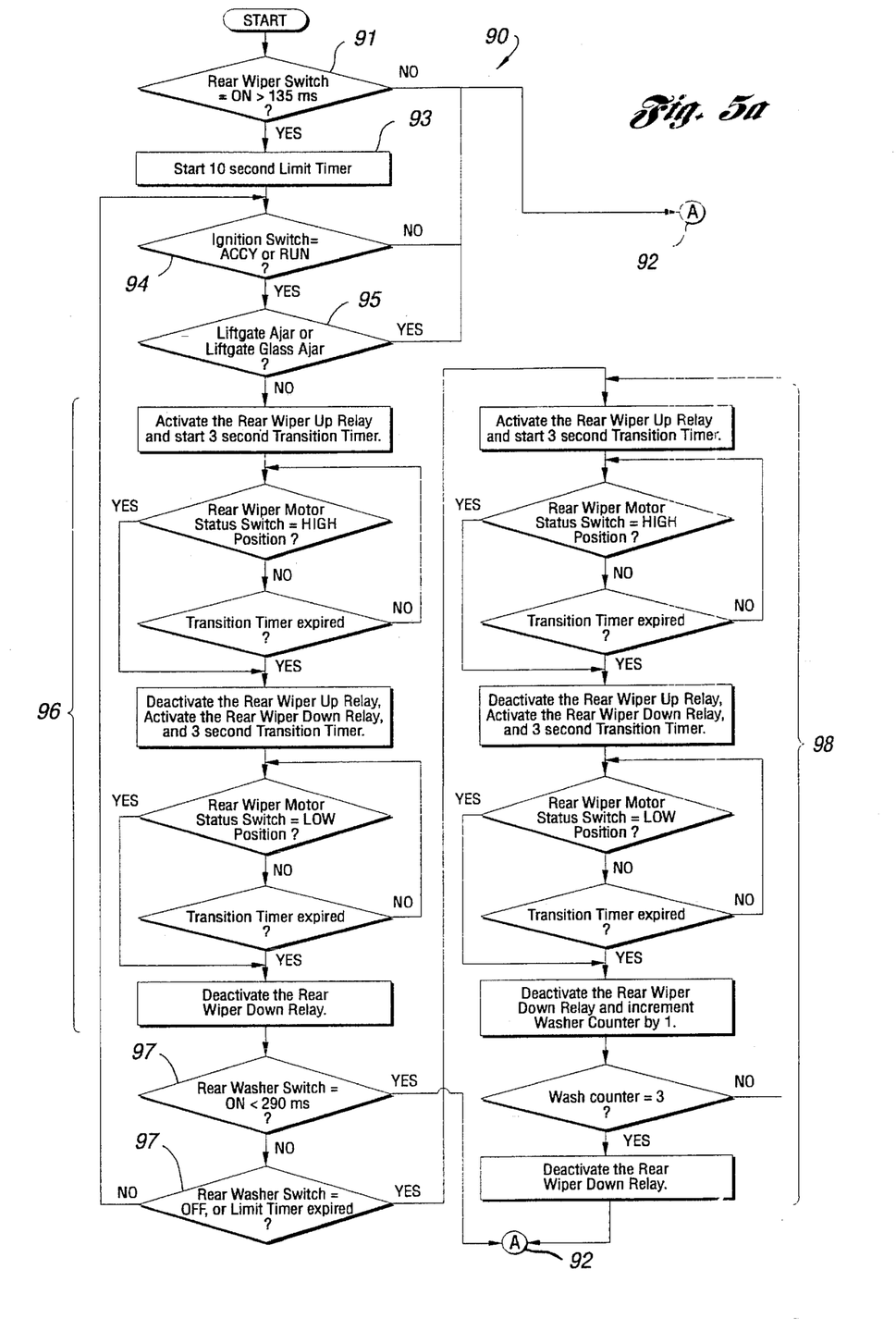
FIGS. 5a and 5b are a washer control flowchart for the control method of the present invention.
Figure 5B:
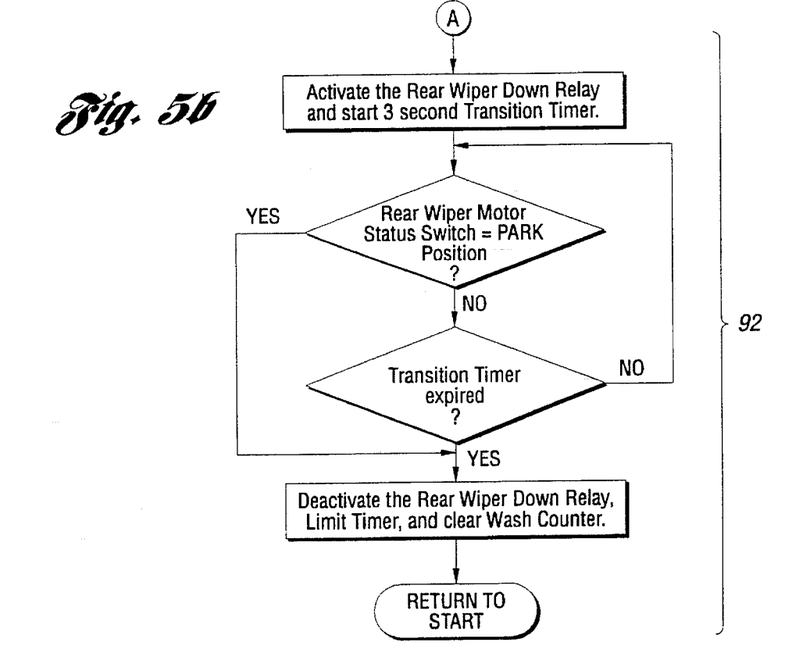

Referring finally to FIGS. 5a and 5b, a washer control flowchart for the control method (40) of the present invention is shown, denoted generally by reference numeral 90. According to the washer control flowchart (90), the system (10) and method (40) of the present invention first check (91) the status of the washer switch (18).

In the event that, as defined above, the washer is inactive after being active for less than approximately 135 milliseconds, the system (10) and method (40) of the present invention proceed to park (92) the wiper (35). To park the wiper (35), the rear wiper down relay (32) is activated until such time as either the motor status switch (36) indicates that the wiper motor (34) has a park position, or a three second transition timer has expired.

However, in the event that, as defined above, the washer remains active for more than approximately 135 milliseconds, the system (10) and method (40) of the present invention proceed to activate a 10 second limit timer (93). Thereafter, the system (10) and method (40) proceed to check (94, 95) the respective statuses of the ignition switch (12), the lift gate position switch (14) and the window position switch (16).

In the event that, as described above, the ignition is inactive, the lift gate is open, or the window is open, the system (10) and method (40) of the present invention proceed to park the wiper (35) as described above (92). However, in the event that, as defined above, the ignition is active, the lift gate is closed, and the window is closed, the system (10) and method (40) proceed to cycle the wiper (35) as the active washer sprays the window with a cleaning solution (96).

To that end, the rear wiper up relay (30) is activated until such time as either the motor status switch (36) indicates that the wiper motor (34) has a high position, or a three second transition timer has expired. Thereafter, the rear wiper down relay (32) is activated until such time as either the motor status switch (36) indicates that the wiper motor (34) has a low position, or a three second transition timer has expired.

Next, the system (10) and method (40) of the present invention again check (97) the status of the washer switch (18). In the event that, as defined above, the washer is inactive after being active for less than approximately 290 milliseconds, the system (10) and method (40) proceed to park the wiper (35) as previously described (92). However, in the event that the washer is inactive after being active for greater than approximately 290 milliseconds, the system (10) and method (40) proceed to cycle the wiper (35) three additional times (98). Thereafter, the system (10) and method (40) proceed to park the wiper (35) as previously described (92).

Finally, in the event that the washer is still active after approximately 290 milliseconds and the limit timer has not expired, the system (10) and method (40) of the present invention again check (72, 73, 74) the respective statuses of the ignition switch (12), lift gate position switch (14), window position switch (16), and wiper switch (20) before a similar cycle (96) of the wiper (35) may be repeated. In the event that the limit timer has expired, the system (10) and method (40) proceed to cycle the wiper (35) three additional times as previously described (98) and then park the wiper (35), as also previously described (92).

Thus, as described above, the system (10) and method (40) of the present invention park the wiper (35) when either the lift gate or the window are open, or when the vehicle ignition switch (12) is turned off. Moreover, the system (10) and method (40) also park the wiper (35) after a "mist" washer cycle wherein the wiper (35) is cycled once when the washer is active between approximately 135 and 290 milliseconds. Finally, the system (10) and method (40) also park the wiper after three additional wiper cycles upon completion of a regular wash cycle.

Accordingly, as described herein, the present invention provides an improved system (10) and method (40) for controlling a wiper (35) for a vehicle window on a lift gate. More specifically, the present invention provides a system (10) and method (40) for controlling a wiper (35) for a vehicle window on a lift gate that is independent of other vehicle systems and parameters, and that accounts for a variety of important rear window wiper (35) parameters including rear window position and lift gate position.

The system (10) and method (40) of the present invention have been described and shown herein in conjunction with the control of a wiper (35) for a vehicle window on a lift gate. As used herein, a lift gate is defined as any vehicle door or entrance having a window, wherein the window may be capable of opening. Thus, it should be readily apparent that the system (10) and method (40) of the present invention are suitable for use in any application wherein control of a wiper (35) for a window on a vehicle entrance may be required.

It is to be understood that the present invention has been described in an illustrative manner and the terminology which has been used is intended to be in the nature of words of description rather than of limitation. Obviously, many modifications and variations of the present invention are possible in light of the above teachings. Therefore, it is also to be understood that, within the scope of the following claims, the invention may be practiced otherwise than as specifically described.

We claim:

1. A system for controlling a wiper for a vehicle window on a lift gate, the system comprising:

means for generating a plurality of input signals indicative of a vehicle ignition status, the wiper status, a washer status, the window position and the lift gate position;

means for processing the plurality of input signals to determine a wiper operation, the processing means including
      means for deciding to cycle the wiper a first preselected number of times when the washer is inactive after being active for greater than a first preselected time period,
      means for deciding to deactivate the washer after the washer has been active for greater than a second preselected time period,
      means for deciding to cycle the wiper a second preselected number of times after the washer has been deactivated,
      means for deciding to park the wiper out of contact with the window after cycling the wiper the first preselected number of times, and
      means for deciding to park the wiper out of contact with the window after cycling the wiper the second preselected number of times; and means for generating an output signal to control the wiper in response to the wiper operation determined.

2. The system of claim 1 wherein the means for generating a plurality of input signals comprises:
   a vehicle ignition switch;
   a wiper switch;
   a washer switch;
   a window position switch; and
   a lift gate position switch.

3. The system of claim 1 wherein the processing means comprises:
   a microprocessor; and
   an input filter and buffer circuit in electrical communication with the microprocessor.

4. The system of claim 3 wherein the means for generating an output signal comprises an output driver.

5. The system of claim 4 wherein the microprocessor, input filter and buffer circuit, and output driver together form a generic electronic module.

6. The system of claim 1 wherein the processing means comprises means for deciding to park the wiper out of contact with the window when the window is open.

7. The system of claim 6 wherein the processing means further comprises means for deciding to park the wiper out of contact with the window when the lift gate is open.

8. The system of claim 7 wherein the processing means further comprises:
   means for deciding to cycle the wiper once when the washer is active for greater than a third preselected time period but less than the first preselected time period; and
   means for deciding to park the wiper out of contact with the window after cycling the wiper once.

9. The system of claim 8 wherein the processing means further comprises:
   means for deciding to cycle the wiper the third preselected number of times when the washer is active for greater than a fourth preselected time period; and
   means for deciding to park the wiper out of contact with the window after cycling the wiper the third preselected number of times.

10. The system of claim 9 wherein the processing means further comprises:
    means for deciding to park the wiper out of contact with the window when the vehicle ignition is inactive; and
    means for deciding to park the wiper out of contact with the window when the wiper is inactive.

11. A method for controlling a wiper for a vehicle window on a lift gate, the method comprising:
    generating a plurality of input signals indicative of a vehicle ignition status, the wiper status, a washer status, the window position and the lift gate position;
    processing the plurality of input signals to determine a wiper operation, the processing including
       deciding to cycle the wiper a first preselected number of times when the washer is inactive after being active for greater than a first preselected time period,
       deciding to deactivate the washer after the washer has been active for greater than a second preselected time period,
       deciding to cycle the wiper a second preselected number of times after the washer has been deactivated,
       deciding to park the wiper out of contact with the window after cycling the wiper the first preselected number of times, and
       deciding to park the wiper out of contact with the window after cycling the wiper the second preselected number of times; and
    generating an output signal to control the wiper in response to the wiper operation determined.

12. The method of claim 11 wherein processing the input signals comprises deciding to park the wiper out of contact with the window when the window is open.

13. The method of claim 12 wherein processing the input signals further comprises deciding to park the wiper out of contact with the window when the lift gate is open.

14. The method of claim 13 wherein the processing means further comprises:
    deciding to cycle the wiper once when the washer is active for greater than a third preselected time period but less than the first preselected time period; and
    deciding to park the wiper out of contact with the window after cycling the wiper once.

15. The method of claim 14 wherein the processing means further comprises:
    deciding to cycle the wiper the third preselected number of times when the washer is active for greater than a fourth preselected time period; and
    deciding to park the wiper out of contact with the window after cycling the wiper the third preselected number of times.

16. The method of claim 15 wherein processing the input signals further comprises:
    deciding to park the wiper out of contact with the window when the vehicle ignition is inactive; and
    deciding to park the wiper out of contact with the window when the wiper is inactive.

* * * * *